Patented Aug. 15, 1933

1,922,083

UNITED STATES PATENT OFFICE 1,922,083

PROCESS OF MAKING CLAY PRODUCTS

Elbert E. Fisher and Malvin A. Baernstein, St. Louis, Mo., assignors to National Pigments and Chemical Company, St. Louis, Mo., a Corporation of Missouri No Drawing. Application June 4, 1931
Serial No. 542,098

4 Claims. (Cl. 106—11)

This invention relates generally to a process of making clay products, such as for instance, pottery, tile, hydraulic press brick and the like, and particularly to a process for counteracting the tendency for discoloration in these various products.

In the manufacture of clay products, such as for instance, tile, pottery, hydraulic press brick and the like, as well as in cementitious products and concrete, there exists a tendency for the appearance upon the surface of the product a discoloring formation, which in the various industries is denominated, blushing, blooming, efflorescence and various other names, which are common to the particular industry concerned. This discoloration, which generally occurs during the setting or baking of the product, and sometimes occurs when the completed product has become exposed to the weather or moisture, is, as a general rule, due to the presence of soluble salts in the mix. For instance, if the discoloration appears while the product is setting or baking, it is apparent that it is due principally to the fact that the entrained water has carried in solution a portion of these soluble salts, and which upon evaporation of the water, are left as a deposit upon the surface of the product, remaining in most instances as a peculiar whitish formation. It is among the objects of this invention to provide a process in which the formation of these discoloring salts or at least the solution thereof in the entrained water and subsequent deposit thereof upon the surface of the product is overcome.

An object of this invention, generally stated, is to provide a process of making ceramic products to secure improved results.

Another object of this invention is to provide a process of making clay products in which the formation of discoloring deposits is prevented.

A further object of this invention is to provide the process of making clay products in which the soluble salts of the mix are rendered inert.

A more specific object of this invention is to provide a process of making clay products in which a material is added to the mix for converting soluble salts present into insoluble salts.

Other objects will become apparent to those skilled in the art when the following description is read:

In accordance with this invention a material having a property which prevents the occurrence of surface discoloration denominated as blushing, blooming or efflorescence in the various branches of the ceramic industry, is added to the ceramic mix preferably when the ingredients thereof are initially mixed. When such an addition agent is added to a ceramic mix, the tendency for surface discoloration or other deleterious effects, due principally to the presence of certain soluble salts in the mix, is counteracted and the finished product will be found to be of uniform character and color.

In accordance with one illustrative embodiment of this invention, a suitable addition agent, such as for instance, a material, containing the oxides of barium and aluminum, may be employed for preventing the occurrence of the surface discoloration. A suitable material is that known as tri-barium aluminate, having a formula ($3BaO \cdot Al_2O_3$), which may be made in accordance with any suitable, well-known process.

The quantity of addition agent, such as for instance, tri-barium aluminate, which it is necessary to add to a particular ceramic mix, will vary in accordance with the raw materials, such as the locality from which the clay is taken as well as the process pursued in the manufacture of the product. As a general rule, however, it is necessary to determine more or less by experience, the appropriate quantity of the addition agent, such as tri-barium aluminate, which will be required for completely preventing an occurrence of surface discoloration in a given procedure.

The action of the tri-barium aluminate or other addition agent upon the ceramic mix in preventing the formation of discoloring deposits is, from a theoretical standpoint, by no means certain, and it is to be understood, therefore, that the invention is not circumscribed by any theoretical consideration, nor is it limited to any illustrative theoretical reaction which may be discussed herein.

The addition agent, such as for instance, tri-barium aluminate, is preferably first ground to sufficient fineness to secure an intimate mixture and uniform distribution thereof throughout the ceramic mix, and is intimately mixed with the other necessary ingredients of the particular mix to be dealt with whether it be for the production of pottery, earthenware, tile, hydraulic press brick or the like. As hereinbefore pointed out, an occurrence of surface discoloration is, as a general rule, due principally to the presence of soluble salts in the ceramic mix. In many cases, in fact, the deleterious action of these soluble salts is not limited to surface discoloration but it is apparent that when an addition agent, such as tri-barium aluminate is added to the ceramic mix in accordance with this invention, the deleterious action of the soluble salts which are usually present in a ceramic mix is overcome. As hereinbefore stated, the reason for this effect is to an extent at least uncertain, although it is believed that the effect is due to a great extent to the presence of the barium, although it is evident that the presence of the aluminum is by no means without merit. It is probable that the barium having as it does a greater affinity for the usual soluble salt forming radicals such as sulphates and carbonates than the element with which they are ordinarily combined in a ceramic mix, such as for instance, calcium, operates to remove the soluble salt forming radicals from combination with the calcium or other materials and to form therewith an insoluble salt. Having thus converted the soluble salts into insoluble salts or at least prevented the solution of the soluble salts in the entrained moisture, the deleterious action thereof, whether it be surface discoloration thereof, or otherwise, is precluded. In view of the fact that the solution of the various soluble salts has been broken down, these salts which generally produce the undesirable surface discoloration are prevented from being carried to the surface and there left as a deposit when the moisture evaporates.

The constituents of the addition agent above discussed may be added in the form of a compound known as sodium barium aluminate, having a formula $(3BaO \cdot Al_2O_3) - (Na_2O \cdot Al_2O_3)$, which may be and preferably is formed in accordance to the process disclosed in the co-pending application of Elbert E. Fisher, Serial No. 537,201 filed May 13, 1931, and in fact under many circumstances, it is found that the effect of such a material as an addition agent is even more beneficial than the effect of the tri-barium aluminate hereinbefore discussed. It is apparent, therefore, that under some circumstances perhaps principally dependent upon the analysis of the raw material, that sodium is a beneficial ingredient while under other circumstances it is of little or no effect.

In accordance with the Process of said Fisher application a furnace product in the form of a clinker is obtained which is relatively rich in soluble barium aluminates and contains a high percent of soluble barium oxide. In accordance with that process, generally, a barium ore, such for instance as barytes, is roasted along with suitable proportions of a sodium salt, such as sodium chloride, and alumina at a temperature sufficient to flux the material and drive off acidic radicals.

Although in the foregoing description an effort has been made and set forth in a theoretical manner, the action which takes place in the formation of ceramic products in accordance with the present invention and the theoretical reasons for such action, it is to be understood that the invention is not limited to processes in which the specific action described in connection with the illustrative embodiments of this invention herein disclosed is followed, it being understood that there are numerous features and phases of the present processes which are at present inexplainable from a theoretical standpoint.

From the foregoing description, it is apparent that many modifications to the process just described will present themselves to those skilled in the art, which will not depart from the spirit of this invention. It is to be distinctly understood, therefore, that the invention is not limited to the specific details hereinbefore described, nor to the use of the specific material disclosed as an addition agent. Furthermore, it is to be distinctly understood that such modifications and the use of equivalent materials to those disclosed herein and which do not depart from the spirit of this invention are, although not specifically described, contemplated by and within the scope of the appended claims.

Having thus described the invention, what is claimed is:

1. In the art of making clay products, the process comprising, adding to the ceramic mix a barium aluminate in an amount sufficient to prevent surface discoloration.

2. A ceramic composition comprising, a ceramic mix, and a barium aluminate in an amount sufficient to prevent surface discoloration.

3. A ceramic composition comprising, a ceramic mix, and tri-barium aluminate in an amount sufficient to prevent surface discoloration.

4. A ceramic composition comprising, a ceramic mix, and sodium-barium aluminate in an amount sufficient to prevent surface discoloration.

ELBERT E. FISHER.
MALVIN A. BAERNSTEIN.